Sept. 16, 1941.  J. F. HARMON  2,256,023
ADJUSTABLE VEHICLE SEAT
Filed Jan. 22, 1940
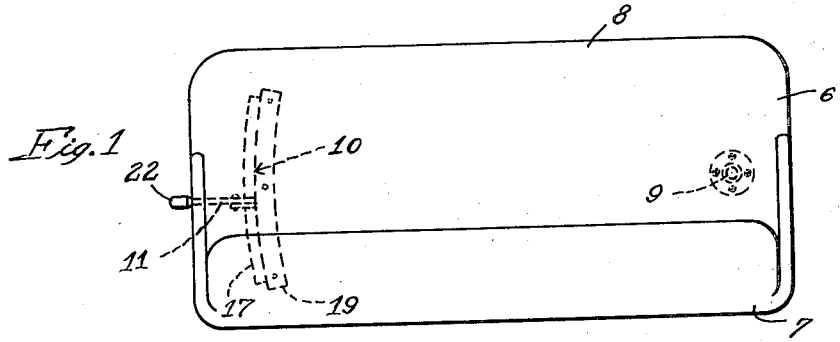
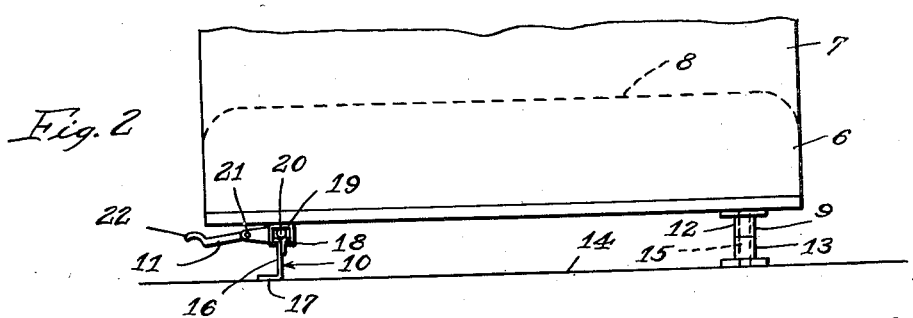
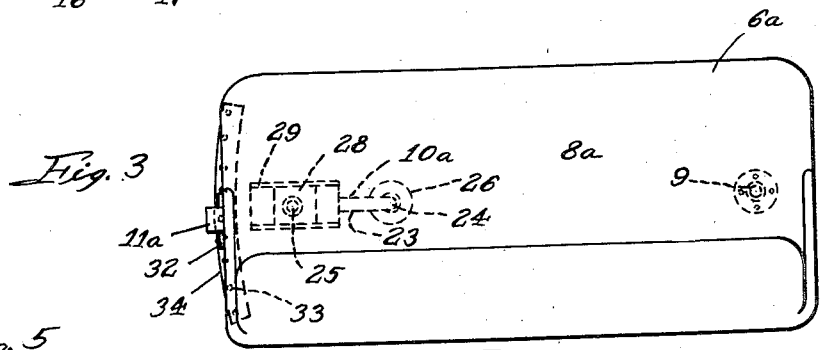
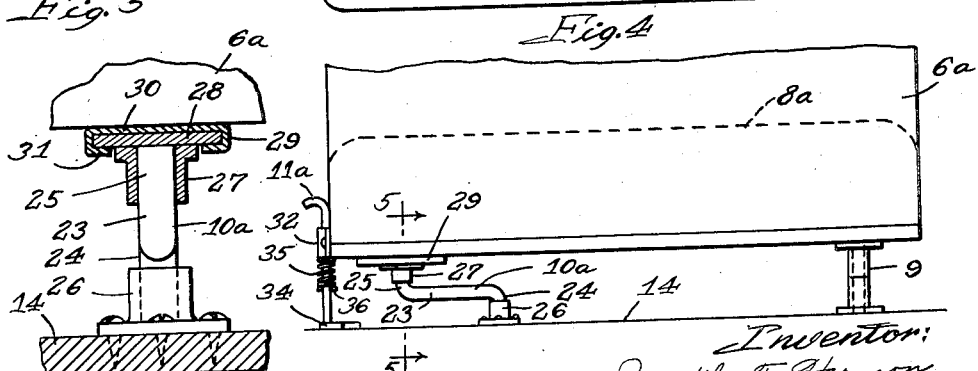
Inventor:
Joseph F. Harmon
By McCanna, Wintercorn & Morebach
Attys.

Patented Sept. 16, 1941

2,256,023

UNITED STATES PATENT OFFICE 2,256,023

ADJUSTABLE VEHICLE SEAT

Joseph F. Harmon, Rockford, Ill., assignor to The Atwood Vacuum Machine Company, Rockford, Ill., a copartnership composed of Seth B. Atwood and James T. Atwood Application January 22, 1940, Serial No. 314,929

3 Claims. (Cl. 155—14)

This invention relates to adjustable vehicle seats and has for its principal object the provision of a seat adjustable back and forth on pivots as distinguished from the conventional slide type adjustable seat supports, whereby to make for easier operation as well as simpler and more economical constructions and ones which do not call for as close accuracy in the installation thereof.

The invention is illustrated in the accompanying drawing, in which—

Figure 1 is a plan view of a vehicle seat equipped with pivot type adjustable supporting means in accordance with my invention;

Fig. 2 is a rear view of the seat with the upper portion thereof broken away;

Fig. 3 is a plan view of another seat showing a modified or alternative form of adjustable supporting means;

Fig. 4 is a rear view of the seat shown in Fig. 3 with the upper portion thereof broken away; and Fig. 5 is a sectional detail on the line 5—5 of Fig. 4 on a slightly enlarged scale.

Similar reference numerals are applied to corresponding parts throughout the views.

Referring first to Figs. 1 and 2, the numeral 6 designates a vehicle seat intended for use in an automobile, for example, as the driver's seat, which requires fore and aft adjustment. The seat 6 has a back 7 extending upwardly from the bottom 8, and the bottom 8 in accordance with my invention has a substantially vertical pivot 9 for the right or passenger end and a concentric arcuate slidable support 10 for the left or driver's end, whereby to permit movement fore and aft of the driver's end of the seat about the pivot 9 as a center. The seat is adjusted through such a small angularity from one extreme position to the other that there is no discomfort for the driver or passenger, and, in fact, it is hardly noticeable in most positions of adjustment of the seat that the back 7 is not truly at right angles to the longitudinal center line of the car except, of course, in the mid-position illustrated. Any suitable or preferred latching means for locking the seat in adjusted position may be used, as, for example, that shown at 11. A seat pivotally supported in this way can be adjusted much more easily than one having substantially parallel supporting slides, because the driver in adjusting the seat about the pivot 9 as a center works on a long moment arm, measured from the pivot point and substantially directly in line with the support 10, or at least on a line tangent thereto, whereas in the case of parallel slides, the driver is working at a considerable disadvantage in attempting to adjust the seat from one end and actually sets up a binding action unless he is careful to move over to the middle of the seat, which in most cases the operator, not familiar with the problem, is not apt to do. Furthermore with the substantially parallel seat slides, care had to be exercised in the installation of the slides to make sure that they were nearly parallel, because slight deviation from parallelism caused binding regardless of how the operator applied force to the seat in adjusting the same. Furthermore, the present construction obviously is much simpler and more economical than the parallel slide type because the pivot 9 replaces one of the slides.

The pivot 9 is illustrated as formed by two flanged collars 12 and 13 arranged to be suitably secured to the bottom of the seat and to the floor 14, as shown, and having a pivot pin 15 entered in registering bores provided therein. The slidable support 10 comprises an arcuate bracket 16 bolted to the floor 14 by the bottom flange 17 and having a T-shaped upper edge portion 18 working in an arcuate channel member 19 that is suitably secured to the bottom of the seat by its web portion, and has two or more spaced balls 20 disposed therein between the web portion of the channel member and the T-shaped upper edge portion 18 of the bracket 16. One flange of the T-shaped upper edge portion 18 of the bracket 16 has notches provided therein in longitudinally spaced relation in which the latch member 11, that is pivoted on the side of the channel member 19, as indicated at 21, is arranged to engage, whereby to lock the channel member 19 in longitudinally adjusted relation to the bracket 16 and accordingly lock the seat in adjusted position. The outer end of the latch member 11 has a handle portion 22 projecting from the side of the seat for convenient operation by the driver, and any suitable spring means, not shown, may be provided for normally holding the latch member 11 in locked relation to the bracket 16 so that when the handle 22 is released the latch member tends to move toward locking position, such operation being common in devices of this kind. For example, the spring may be and preferably is arranged to move the latch member 11 normally in a counter-clockwise direction about the center 21 toward locking relation to the notched flange on the bracket 16, and when moved by the lifting of the handle end 22 is released against the action of the spring to allow movement of the seat forwardly or rearwardly about the pivot 9.

The support shown in Figs. 3 to 5 in connection with the seat 6a operates in a closely similar manner, there being a pivot 9 for the passenger end of the seat bottom 8a relative to which the seat as a whole is arranged to oscillate to adjust the driver's end of the seat forwardly and rearwardly. The support indicated at 10a comprises a crank member 23 having parallel pivot pin ends 24 and 25, the pin 24 working in a bearing 26 fastened to the floor 14 and the pin 25 working in a bearing 27 secured to a slide 28 working in a guide 29 fastened to the bottom of the seat and extending lengthwise with respect thereto, as indicated in Fig. 3. The guide 29 is preferably of inverted channel constructed, as indicated in Fig. 5, arranged to be secured to the bottom of the seat by its web portion 30 and having inturned edge portions 31 on the flanges thereof to retain the slide 28. The operation of this supporting means is very similar to that previously described, but it is clear that the plurality of pivots at 9, 24, and 25 make for easier operation. The operator adjusting the seat from the normal position, that is at the driver's end of the seat, finds it an easy matter to move the seat in either direction because of the long moment arm he is working on with respect to the pivot 9 and also the appreciable moment arm with respect to the pivot 24. There is very little sliding movement of the slide 28 in the guide 29 in the usual amount of adjusting movement given the seat. Any suitable or preferred means may be employed for locking the seat in adjusted position, as, for example, a latch member 11a slidable vertically in a guide 32 fastened to the end of the seat, the latch member being arranged to enter any one of a series of holes 33 located in spaced relation on an arc with the pivot 9 as a center in a plate 34 suitably secured to the floor 14. The latch member 11a is normally urged downwardly by means of a spring 35 acting between the guide 32 and a crosspin 36 in the lower end portion of the latch member.

It is believed the foregoing description conveys a good understanding of the objects and advantages of my invention. The appended claims have been drawn to cover all legitimate modifications and adaptations.

I claim:

1. An adjustable seat adapted for use in automobiles and the like comprising in combination with a seat adapted to extend an appreciable portion of the width of the interior of the vehicle, means providing an upright pivotal support for that end of the seat remote from the driver's position, a crank member having substantially parallel upright pivot pin ends spaced longitudinally with respect to the seat for adjustably supporting the driver's end of the seat, a fixed bearing support for one of said pivot pins adapted to be secured to the floor under the driver's end of the seat, another bearing support for the other pivot pin carried on a slide working in a guide adapted to be secured to the bottom of the seat extending longitudinally with respect thereto, and means for securing the seat in adjusted position.

2. An adjustable seat adapted for use in automobiles and the like comprising in combination with a seat adapted to extend an appreciable portion of the width of the interior of the vehicle, means providing an upright pivotal support for that end of the seat remote from the driver's position, a crank member having substantially parallel upright pivot pin ends spaced longitudinally with respect to the seat for adjustably supporting the driver's end of the seat, bearing supports for the two pivot pin ends of said crank member, one of which is arranged to be fixed and the other of which is arranged to be slidable, whereby to locate the crank member in a predetermined position under the driver's end of the seat, a slide for the slidable bearing support, a guide therefor extending lengthwise with respect to the seat, and means for securing the seat in adjusted position.

3. A structure as set forth in claim 1, wherein the means for securing the seat in adjusted position comprises a latch member moving with the driver's end of the seat and a keeper plate adapted to be secured to the floor having a plurality of holes provided therein to receive the latch member in spaced relation on an arc with the first mentioned pivot as a center.

JOSEPH F. HARMON.